Feb. 8, 1944.　　　G. S. DUNHAM　　　2,341,087
SEPARATOR
Filed May 6, 1942　　　2 Sheets-Sheet 1
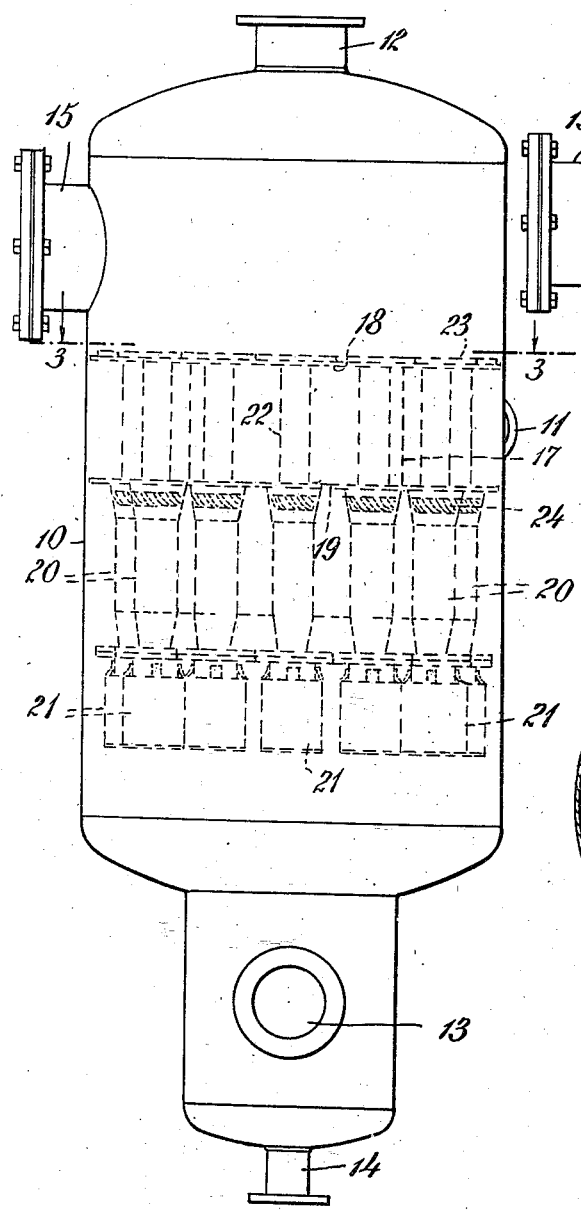
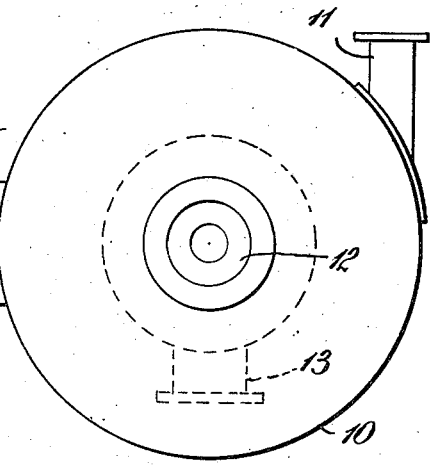
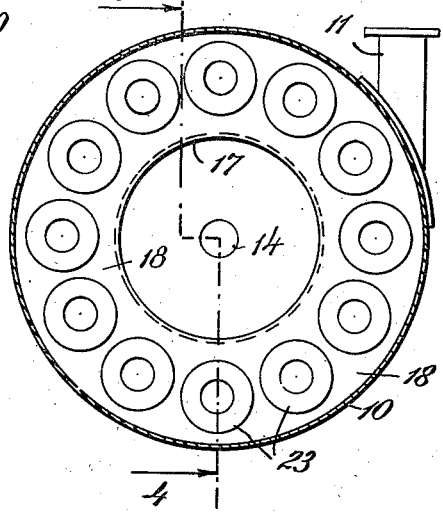
INVENTOR
GEORGE S. DUNHAM
BY
ATTORNEY Feb. 8, 1944.                G. S. DUNHAM                2,341,087
                               SEPARATOR
                            Filed May 6, 1942            2 Sheets-Sheet 2

INVENTOR
GEORGE S. DUNHAM
BY
    Oswald G. Hayes
       ATTORNEY

Patented Feb. 8, 1944

2,341,087

UNITED STATES PATENT OFFICE 2,341,087

SEPARATOR

George S. Dunham, Merion, Pa., assignor to Socony-Vacuum Oil Company, Incorporated, New York, N. Y., a corporation of New York Application May 6, 1942, Serial No. 441,913

2 Claims. (Cl. 183—83)

This invention pertains to a device for the separation of fluids of different density and is particularly adapted for the separation of liquids from vapors.

In many industrial installations it is desirable to separate a liquid from a gas as completely as is practicable. A typical example is in the preparation of petroleum fractions for various processing steps, such as catalytic cracking. Such cracking involves passing a suitable cracking stock in contact with a catalyst, such as clay, or a synthetic alumina-silica composition until the deposition of coke on the catalyst contaminates the same to an extent which reduces cracking efficiency below a practical minimum. The coke is then burned off with preheated air and is ready for renewed cracking. The actual time of these plants operated for cracking is considerably below 50% of total operating time and every precaution must be taken to reduce coking of the catalyst and consequent reduction of "on-stream" time through increased time for burning of the coke. In general, the heavy constituents of the crude from which the charge for catalytic cracking is made up are much more prone to form carbonaceous deposits. The separation of heavier materials from the charge is therefore a matter of primary importance. Usually the raw crude is heated to a temperature to vaporize the constituents desired for charge to the cracking unit and passed to a vaporizing chamber from which vapors to be used in preparation of the charge are withdrawn as such, while heavier material remains unvaporized and is withdrawn as a liquid often referred to as tar. Some of the tar remains suspended in the vapors and is carried through with the vapors. The problems involved in separating out such suspended tar are very troublesome.

I have now designed a unit which separates out the suspended tars to give a substantially tar-free vapor, which unit may be used as the vaporizing chamber or included in the line intermediate the heater and cracking chambers. Briefly stated, the invention contemplates provision of an enlarged chamber having an annular chamber therein communicating with the main chamber by outlets for vapor and liquid and means for admitting fluids to the annular chamber. Interposed between the annular chamber and the outlets to the main chamber are means for positively separating vapor and liquid.

Other objects and advantages of the invention will be apparent from the discussion herein of a preferred embodiment of the invention illustrated in the drawings, wherein Figure 1 is an elevation of apparatus embodying the principles of the invention;

Figure 2 is a plan view thereof;

Figure 3 is a section on line 3—3 of Figure 1; and

Figure 4:
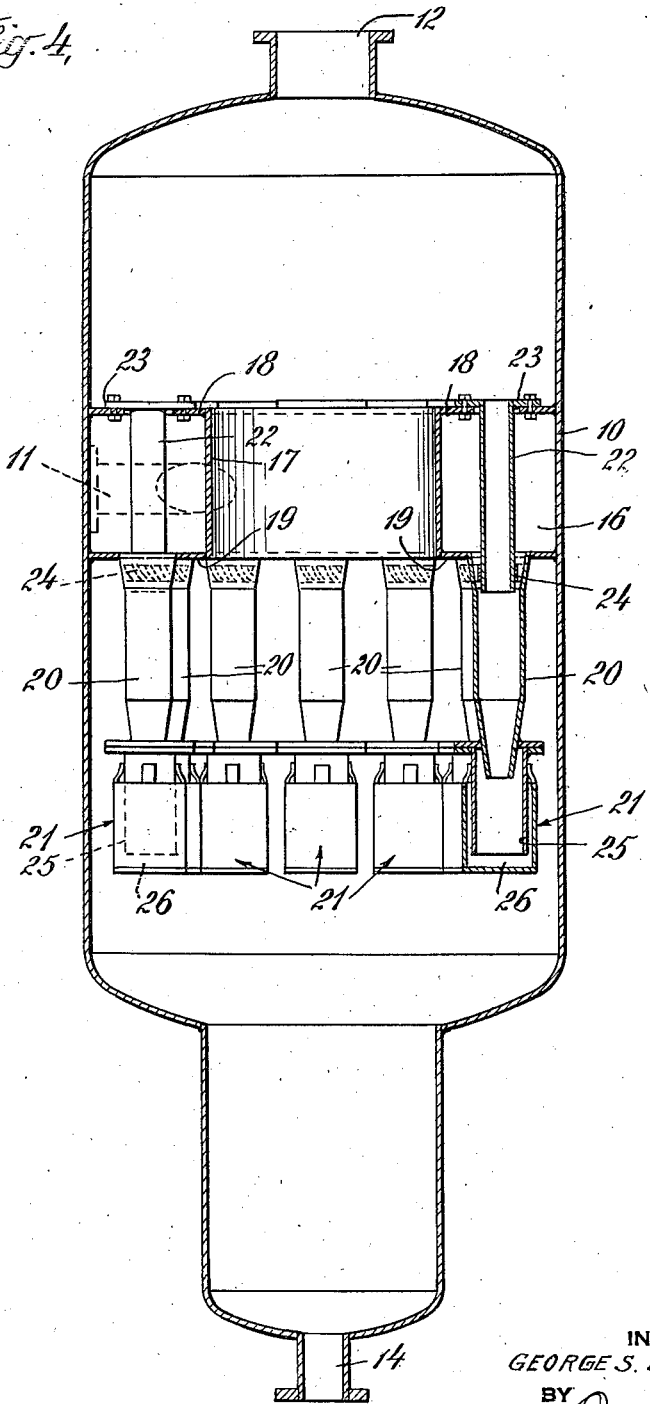
Figure 4 is a section on line 4—4 of Figure 3.

The device comprises a shell 10 defining a large chamber to which preheated feed is supplied through inlet 11, while vapors are withdrawn through outlet 12 in the top and liquids through outlets 13 and 14. A manway 15 is provided for use in cleaning and/or repair. The inlet 11 discharges into an annular space 16 defined by the shell, annular wall 17 and upper and lower plates 18 and 19. Disposed equally throughout the annular space 16 are a plurality of unit separators each communicating with space 16 through an opening in lower plate 19 to which is fitted a depending nozzle 20 which communicates at its lower end with the interior of the chamber through a trap indicated generally at 21 and is fitted with a tube 22 extending through the annular space from an open end fitted in flange 23 to a point within the nozzle 20 well below the upper end of said nozzle. Arranged between the nozzle 20 and the tube 22 is a series of vanes 24 arranged generally helically with respect to the axis of tube 22 and nozzle 20.

As will be seen from Figure 4, the trap 21 consists of a pipe 25 open at the bottom surrounding the lower end of nozzle 20 and submerged in an open cup 26. The vanes 24 are preferably formed to impart to gases passing therethrough a whirling motion opposite in direction to that prevailing in the annular space by reason of the tangential discharge of inlet 11. In the embodiment shown, gases in the annular space will be given a clockwise motion (looking down), while the vanes 24 in each of the unit separators will impart to the gases passing therethrough a counterclockwise motion.

In operation, wet gases and/or a liquid to be vaporized will be supplied to the annular space by inlet 11 wherein vaporization to an extent dependent upon nature of the material charged, temperature and pressure may take place; the wet gases as charged and/or formed being given a whirling motion in a clockwise direction by reason of the tangential discharge from inlet 11 to the annular space. A portion of the gases containing entrained liquid will pass into the upper part of each unit separator and down through the vanes 24 whereby it will be given a whirling motion in a counter-clockwise direction. There is a tendency to concentration of the entrained liquid in the outer portion of the annular space and some drops will be formed there. The principal separation, however, augmented to some extent by the drops already formed, occurs in and below the vanes 24. Here the velocity of the fluid is greatly increased and a sharp whirling action causes liquids to move outwardly against the wall of nozzle 20 leaving a central portion of substantially dry gas to pass upwardly through tube 22 to enter the chamber proper for discharge from the unit. The trap 21 will prevent passage of gaseous material as such to the chamber directly through nozzle 20. On the other hand, the tar often contains in solution appreciable amounts of material suitable for the vapors. The discharge of the tar from trap 21 to the chamber proper permits vaporization of such dissolved matter, thus substantially increasing the efficiency of vaporization.

I claim:

1. In a device of the class described, means defining a chamber, means defining an annular space within said chamber and a central chimney within said space to establish communication between the ends of the chamber, means for admitting fluid tangentially to said space to impart a rotary motion to fluid in said space, means to withdraw fluid from the top of said chamber, means to withdraw fluid from the bottom of said chamber and a plurality of unit separators spaced about and communicating with said space each comprising a tubular member open to and extending downwardly from the bottom of said space, a liquid trap on the bottom of said member adapted to permit flow of liquid and inhibit flow of gas from said member to said chamber, a tube open at both ends extending from a point within the upper part of said member coaxially therewith to said chamber above said space and a plurality of helical vanes between said member and said tube.

2. In a device of the class described, means defining a chamber, means defining an annular space within said chamber and a central chimney within said space to establish communication between the ends of the chamber, means for admitting fluid tangentially to said space to impart a rotary motion to fluid in said space, means to withdraw fluid from the top of said chamber, means to withdraw fluid from the bottom of said chamber and a plurality of unit separators spaced about and communicating with said space each comprising a tubular member open to and extending downwardly from the bottom of said space, a liquid trap on the bottom of said member adapted to permit flow of liquid and inhibit flow of gas from said member to said chamber, a tube open at both ends extending from a point within the upper part of said member coaxially therewith to said chamber above said space and a plurality of helical vanes between said member and said tube adapted to impart to fluids passing therethrough a rotary motion opposite that prevailing in said space.

GEORGE S. DUNHAM.